United States Patent [19]

Enter

[11] 3,905,153

[45] Sept. 16, 1975

[54] AUTOMATIC INTERIOR ENVIRONMENT CONTROL

[76] Inventor: William L. Enter, 7705 Aquaclear Rd., Mustang, Okla. 73064

[22] Filed: Jan. 9, 1974

[21] Appl. No.: 431,682

[52] U.S. Cl. .................... 47/58; 98/33 A; 356/215; 165/2; 47/17

[51] Int. Cl. ............................................... A01g 9/14

[58] Field of Search ............... 47/17, 1.2, 58; 165/2, 165/26; 98/33; 356/213, 215

[56] References Cited

UNITED STATES PATENTS

| | | | |
|---|---|---|---|
| 3,016,801 | 1/1962 | Michel | 47/17 X |
| 3,063,195 | 11/1962 | Ravich | 47/17 |
| 3,673,733 | 7/1972 | Allen | 47/58 |
| 3,747,501 | 7/1973 | Honda et al. | 98/33 A |
| 3,807,088 | 4/1974 | Jones | 47/1.2 |

FOREIGN PATENTS OR APPLICATIONS

| | | |
|---|---|---|
| 1,199,278 | 7/1970 | United Kingdom |

*Primary Examiner*—Robert E. Bagwill
*Attorney, Agent, or Firm*—Robert M. Hessin

[57] ABSTRACT

Apparatus for automatic control of environmental conditions in building interiors, particularly in greenhouses where exacting conditions of temperature must be met. The apparatus consists of electronic circuitry for sensing and providing output indication of temperature, incident solar radiation, daily solar radiation accumulation and nocturnal temperature modification, an executive set-point and an insecticide control set-point, all of which outputs are applied to a summation device whereupon level detection actuates control circuitry to activate heating and/or cooling apparatus, insecticide control apparatus and other attendant equipment.

4 Claims, 3 Drawing Figures

AUTOMATIC INTERIOR ENVIRONMENT CONTROL

BACKGROUND OF THE INVENTION

1. Field of the Invention

The invention relates generally to temperature control systems and, more particularly, but not by way of limitation, it relates to improved automated temperature control systems which are particularly adapted for controlling temperature in relation to all phases of operations in and about greenhouses and other building installations requiring exacting temperature control.

2. Description of the Prior Art

The prior art includes various types of thermostatic control systems wherein heating and/or cooling apparatus is controlled in response to temperature sensing such as the well-known form of residential thermostatic control system. Such devices essentially consist of a sensing element in control of a reactance device which is activated between predetermined limits to maintain proper energization of the related heating and/or cooling apparatus attendant therewith. Other more sophisticated devices have been developed for particular applications wherein the exigencies of the application require extremely exacting control or regulation at abnormally high or low temperatures. Heretofore, the conventional types of devices have been employed for temperature control in and around greenhouses and other horticultural installations and their operation has been accepted as satisfactory for the purpose as employed. Set-point adjustment is done manually and in accordance with the operator's judgment of sunlight intensity. Night temperatures are manually set also. This requires much attention. Separate heating and cooling thermostats are usually used.

SUMMARY OF THE INVENTION

The present invention contemplates a complete automatic temperature control system which is particularly adapted for installation to control temperatures in larger types of buildings, arenas and the like. The present system is particularly adapted for controlling temperature in and about greenhouses, such temperature response being formulated in relation to various parameters peculiar to a horticultural operation. The automatic control system not only functions to maintain ambient daytime temperatures according to incident solar radiation, but it also serves to automatically regulate nocturnal temperatures in accordance with accumulated daily incident solar radiation and to optimally adjust temperatures in relation to time during and after insecticidal operations in the environment. The apparatus of the invention derives a plurality of electrical output indications relating to each of instantaneous temperature, solar radiation, accumulated daily radiation, executive control modification, and insecticide modification, whereupon the electrical outputs are summed and level detected to control related heating and cooling apparatus which serves the environmental area or building.

Therefore, it is an object of the present invention to provide a temperature control system which automatically controls all phases of temperature adjustment in and around a greenhouse.

It is also an object of the invention to provide a method for controlling the nocturnal temperature of a greenhouse in accordance with the optimum photosynthetic requirements of the horticultural residents.

It is yet another object of the present invention to provide apparatus for temperature control which enables more effective insecticide application.

Finally, it is an object of the present invention to provide a completely automated multi-purpose temperature control system of relatively low cost and high reliability.

Other objects and advantages of the invention will be evident from the following detailed description when read in conjunction with the accompanying drawings which illustrate the invention.

DETAILED DESCRIPTION OF THE PREFERRED EMBODIMENT

Figure 1:
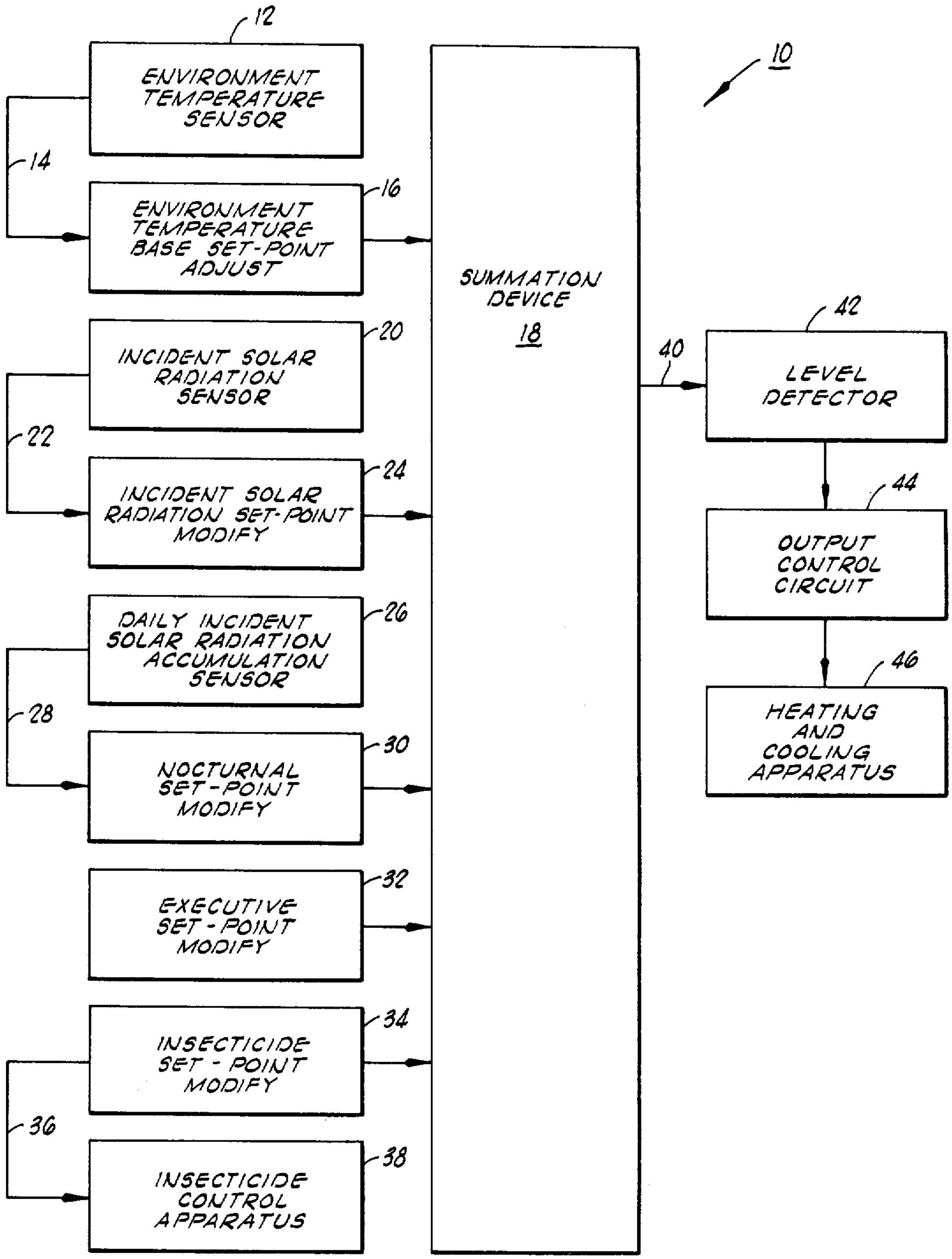
FIG. 1 is a block diagram of the temperature control system of the present invention.

FIG. 1 illustrates all of the essential elements of a control system 10 as constructed in accordance with the present invention. An environment temperature sensor 12 provides continuous electrical signal indication of ambient temperature on line 14 for input to an environment temperature base set-point adjust stage 16. The output from the set-point adjust stage 16 is then applied to a summation device 18. Depending upon the size of the installation, it may be desirable to include a plurality of environment temperature sensors 12 located at critical points around the installation and providing input to some form of averaging device, e.g. an operational amplifier averaging circuit, the output of which is then applied via line 14 to environment temperature base set-point adjust 16.

An incident solar radiation sensor 20 provides electrical signal output on a line 22 which is indicative of instantaneous solar radiation, i.e. through the building roof panes or openings, and the proportional electrical signal is applied to an incident solar radiation set-point modify stage 24 which then provides output to summation device 18. The amount of solar radiation accumulated during a daily period is provided by a sensor 26 by means of an electrical signal on line 28 for application to a nocturnal set-point modify stage 30. Adjusted output is then applied to summation device 18 in accordance with predetermined setting.

An executive set-point modify stage 32 may be effective on a periodic timed basis or upon specific operator actuation in accordance with management prerogatives to provide input to summation device 18. An insecticide set-point modify stage 34, also actuatable on timed basis or by specific operation, provides yet another input to summation device 18, additional output via line 36 from insecticide set-point modify stage 34 is utilized to energize insecticide control apparatus 38 of selected type, as will be more fully described below.

The summation device 18 accepts all inputs for summation to provide an arithmetic sum output voltage on line 40 to a level detector 42. The level detector 42 provides comparison of input levels to generate characteristic output for application to output control circuit 44 which, in turn, controls energization of heating and cooling apparatus 46.

Figure 2:
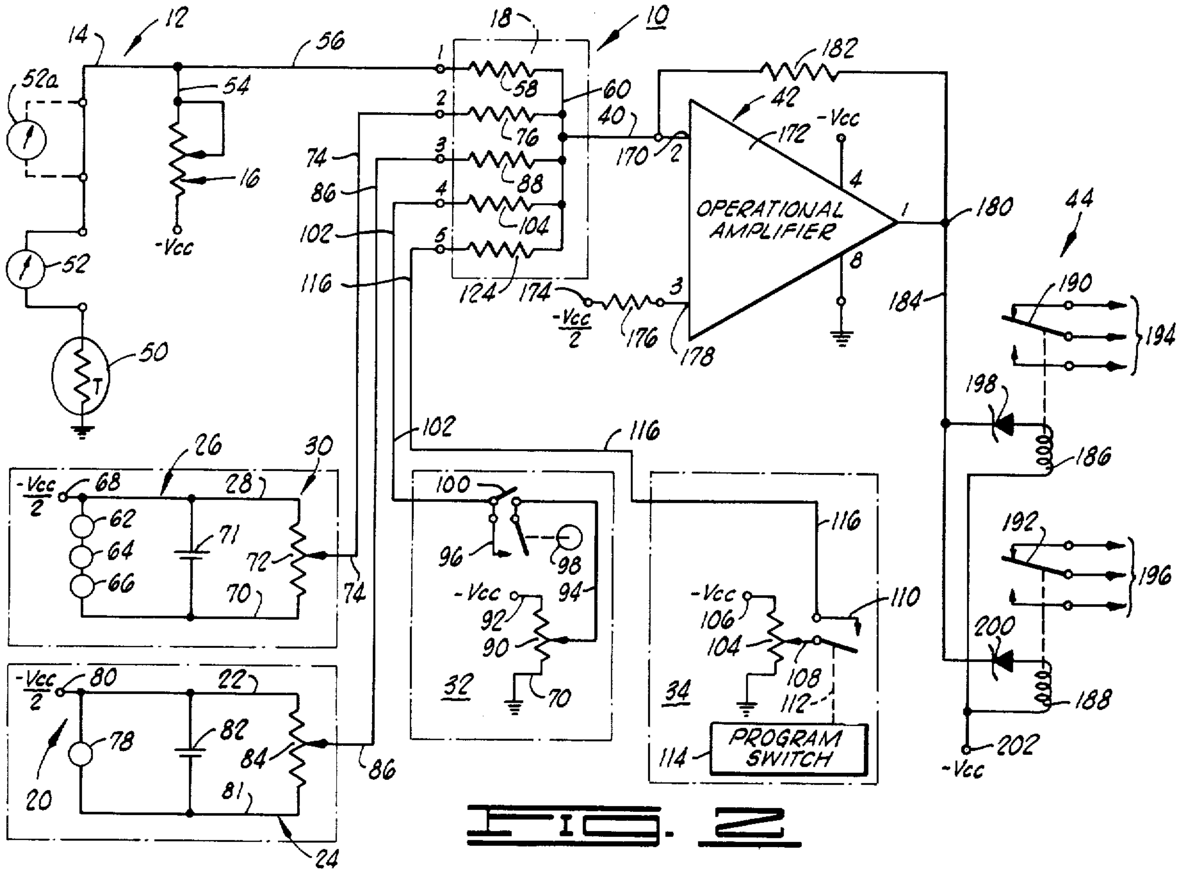
FIG. 2 is a schematic diagram of the temperature control system.

Referring now to FIG. 2, the control system 10 is shown in greater detail with all FIG. 1 block portions similarly numbered. Remote temperature sensing is effected by a thermistor 50 or, alternatively, a plurality of thermistors 50 connected for averaging output for conduction through a milliameter 52 which provides temperature indication at a central or operator location. Additional milliameters for temperature indication may be installed at other remote or office locations as shown by milliameter 52*a*. The voltage drop through the milliameters 52 is minimal and a proportional electrical signal from thermistor 50 is conducted via line 14 to the set-point adjust potentiometer 54 which is connected to the $-Vcc$ voltage supply. The output from the temperature set-point adjust 16 is then applied via lead 56 for input to summation device 18, and as specifically shown in this embodiment the signal is input to summation resistor 58 as connected to output buss 60.

The radiation accumulation sensor 26 consists of plural solar cells 62, 64 and 66 connected in series between the $-Vcc/2$ voltage supply 68 and lead 70. A radiation accumulation device in the form of a nickel-cadmium rechargeable dry cell 71 is connected in parallel to the solar cells 62–66 between lead 70 and lead 28 as is also the nocturnal set-point modify stage 30, a potentiometer 72. Output from potentiometer 72 is via a lead 74 for input to summation device 18 at summing resistor 76. The dry cell 71 is a standard type having a potential of about 1.2 volts at full charge, and solar cells 62, 64 and 66 each have a voltage of about 0.45 volts when activated.

Solar radiation is sensed by solar cells 62–66 to charge accumulator dry cell 71 with a current which is proportional to sunlight intensity. The voltage of dry cell 71 is essentially constant after about one hour of sunlight, and this will cause the charge stored in dry cell 71 to be proportional both to the sunlight intensity detected and to the number of hours sunlight is present. The value of potentiometer 72 is selected so that it serves to discharge dry cell 71, when there is an absence of sunlight, at a rate required to completely discharge the dry cell 71 in approximately the same amount of time which is required for charging.

The solar radiation sensor 20, a single solar cell 78 is connected between $-Vcc/2$ terminal 80 and lead 81 while a nickel-cadmium rechargeable dry cell 82 is connected in parallel therewith as is the set-point adjust 24, a potentiometer 84. Adjusted output from potentiometer 84 is then applied via lead 86 for input to summation device 18, i.e. the summing resistor 88 therein. The solar cell 78 serves to sense ambient sunlight to provide a voltage output which is proportional to instantaneous ambient sunlight intensity and that voltage is applied across potentiometer 84 for adjustment of the base set-point. The dry cell 82 acts as an energy conservation device in concert with potentiometer 84 as it serves to prevent needless repeated energization of heating and cooling equipment 46 (FIG. 1) when variable cloudiness prevails. This feature is unique in that only one thermostat is needed to operate both heating and cooling equipment without overlapping functions. That is, dry cell 82 and potentiometer 84 act as a long time constant filter or averaging circuit.

Although it appears that dry cell 71 and dry cell 82 function in like manner, they actually operate in quite different modes of operation. Thus, the voltage of dry cell 71 is allowed to increase to its rated voltage whereupon it continues to charge if sunlight is present although there is but negligible voltage increase. Due to this, its charge is not proportional to its voltage but is proportional to the length of time that the sunlight has irradiated the solar cells 62–66. Contrary to this, the voltage across dry cell 82 can never charge to its rated voltage due to the single solar cell 78. The charge across dry cell 82 will then be proportional to the voltage developed across single solar cell 78 since current flow into dry cell 82 will cease when the voltage thereacross equals the voltage across solar cell 78. Therefore, the charge across dry cell 82 is proportional to the average solar radiation during the most previous several minutes.

The executive set-point modify circuit 32 consists of a potentiometer 90 connected across the $-Vcc$ lead 92 and common 70 and it is adjusted to provide output via lead 94 to timer contacts 96 which may be periodically closed by a conventional form of timing mechanism 98, e.g. a 24 hour timing device of commercially available form. By executive or operational choice, output on lead 94 may be connected via timer contacts 96 or manually operable switch 100 and circuit output is provided via lead 102 for input to summing resistor 104 of summation device 18. The executive set-point potentiometer 90 is employed to modify the set-point in accordance with managerial wishes. This may be required for personal comfort when doing work within the enclosed area or other specific timed intervals, e.g. during dark cloudy weather when a condition of over-watering and heavy nitrogen application has occurred.

The insecticide set-point modify circuit 34 includes a potentiometer 104 as connected between the $-Vcc$ voltage supply terminal 106 and neutral with adjustable voltage output available on a lead 108 leading to switch contacts 110. The switch contacts 110 are controlled by a mechanical linkage 112 as actuated by a program switch 114 in suitably timed manner. The program switch 114 may be any of the various multiple cam switching circuits, as will be further described below. For example, one suitable form of program switch may be a model "Acton" switch programmer as commercially available from Sealectro Corporation of Mamaroneck, N.Y. The output voltage from switch contacts 110 is taken via a conductor 116 to a summing resistor 124 of summation device 18.

Figure 3:
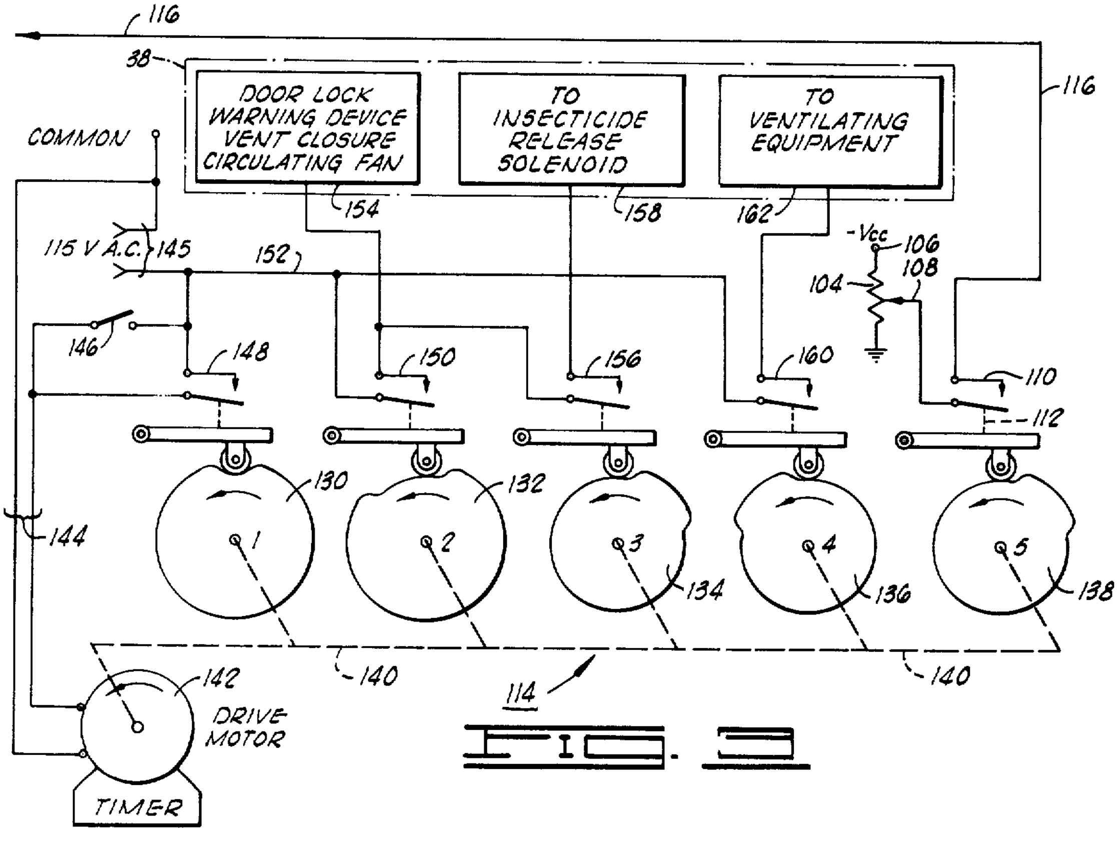
FIG. 3 is a schematic representation of insecticide control and set-point modification circuitry as shown in FIG. 2.

FIG. 3 illustrates one form of program switch 114 and associated circuitry in greater detail. The program switch 114 is a multiple cam switching device wherein a plurality of control cams 130, 132, 134, 136 and 138 are driven in synchronous concert by rotational motion applied along mechanical linkage 140 as connected to timer drive motor 142. The timer drive motor 142 may be a twenty-four hour synchronous timer device of well-known structure which provides a continual cycling of functions through drive of control cams 130–138. The timer drive motor 142 is energized via leads 144 connected to the 115 volt AC source connections 145, and starting may be effected by switch 146 with circuit holding function effected by cam switch 148 throughout rotation of control cam 130 which, in the case of a twenty-four hour timer, will make one revolution in a twenty-four hour period after which it can be restarted by closure of switch 146.

The control cam 132 controls closure of cam switch contacts 150 to provide A-C energization from A-C lead 152 to a block stage 154, part of insecticide control apparatus 38 (FIG. 1), which may control functions, such as door lock warning device, vent closure, and energization of circulating fans. In like manner, the control cam 134 periodically closes cam switch 156 to provide A-C energization (only when cam switch 150 is closed) to an insecticide release solenoid 158. Control cam 136 functions in similar timed manner to close cam switch 160 to actuate ventilating equipment 162, as will be further described below. Any of various forms of insecticide dispensing and circulating equipment may be utilized. For example, solenoid controlled dispensers for either of liquid or powder insecticide may be controlled by the program switch 114 along with the ventilating warning and circulating devices which function in co-action therewith. Such equipment is well-known and commercially available for addendum to the control system 10. In addition, additional control cams may be employed in accordance with requirements of the particular insecticidal system since it is only necessary to include additional cams for each additional function or functions as required by the specific insecticides and required modes of application.

Referring again to FIG. 2, output on summation device 18 via lead 40 is applied to an input 170 of an operational amplifier 172 which functions as a voltage level comparator. The $-Vcc/2$ power is supplied at a terminal 174 through a current limiting resistor 176 to the remaining input 178 of operational amplifier 172. The operational amplifier 172 is a conventional integrated circuit module and, in present equipment design, is one-half of a dual 741C operational amplifier. Also in present design, summation device 18 is constituted such that resistors 58, 76, 104 and 124 are each of 10 kilohm value while resistor 88 is a 2.7 kilohm value.

Output from operational amplifier 172 is derived at junction 180 as control feedback is supplied through a resistor 182 to input terminal 170 and output voltage indication is present on lead 184. The biasing of operational amplifier 172 is carried out with terminal number 8 connected to ground and terminal number 4 connected to the $-Vcc$ power supply in conventional manner. The output voltage present on lead 184 is then connected in parallel to control relays 186 and 188 which control respective switch contacts 190 and 192 to control energization of output leads 194 and 196, respectively. Output on leads 194 and 196 may then be applied in conventional manner for control of heating and cooling apparatus (FIG. 1) through direct energization or, if necessary, through ancillary motor control circuitry. Zener diodes 198 and 200 are connected in series with respective relays 186 and 188 to control energization voltage levels. The zener voltages of diodes 198 and 200 are selected to be different such that it enables a stepped energization, as will be further described below. The $-Vcc$ power supply is connected at terminal 202 for parallel energization of each of relays 186 and 188.

OPERATION

The present invention is utilized to provide complete and automatic temperature control, day and night, of a greenhouse installation or other building interiors having similar form of exacting temperature requirements. Control system 10 is utilized to set day and night temperatures for all conditions and may be pre-adjusted to take into account all factors such as time of year, type of horticultural life, general humidity levels and the like, in order to assure optimum growth conditions and fruit or flower bearing potential. The temperature base set-point adjust potentiometer 54 provides a divided voltage at pre-set level through summation device 18 for input to operational amplifier 172. The operational amplifier 172 compares the input voltage level with the $-Vcc/2$ voltage level applied at input 178 (terminal 3) to derive voltage output on lead 184. When the ambient temperature is above the base set-point adjustment as set in at potentiometer 54, the output voltage from operational amplifier 172 is equal to $-Vcc$ such that relays 186 and 188 are de-energized. When the temperature falls below the set-point, the output voltage of operational amplifier 172 falls toward zero volts and relays 186 and 188 are energized in a stepped manner to provide control output on leads 194 and 196 which, in this case, would energize heating equipment to rectify the ambient temperature. When the ambient temperature is in the allowable set-point limits, relay 186 will be energized while relay 188 is de-energized due to the fact that zener diodes 198 and 200 are selected to have different effective zener levels to provide a differential energization level as between the two relay stations 186 and 188. It should be understood, too, that the stages may be proliferated by the addition of relays and associated zener diodes, and present designs call for four such output relay stages, two for heating and two for cooling control.

The nocturnal set-point modify potentiometer 72 is set to provide night time temperature level decrease or increase in accordance with the sensing by solar cells 62, 64 and 66 of the amount of sunlight total during the preceding day. Thus, it can be determined that for a certain amount of total sunlight in a day there can be a certain excess amount of photosynthetic process storing growth energy in the plants which, in turn, will give rise to a need for an optimum night time temperature during which the plant growth can utilize such energy. An optimum nocturnal temperature can be derived to provide most healthy plant growth through the nocturnal periods and such temperature modification is set in by adjustment of potentiometer 72. Through the day the solar cells 62, 64 and 66 charge the radiation accumulation device or dry cell 71 with current proportional to sunlight intensity. As previously stated, the voltage of dry cell 71 is essentially constant after about one hour of sunlight which causes the charge stored in dry cell 71 to be proportional both to sunlight intensity and to the number of hours during which sunlight is present.

Setting of modification potentiometer 72, while also providing a small percentage of the required daytime temperature set-point increase through summation network 18, provides a set-point increase after nightfall as the dry cell 71 discharges through potentiometer 72. In like manner, a situation wherein a sunny morning is followed by a cloudy afternoon will give the same effect with a raised set-point during the afternoon because the nocturnal set-point modify treats any period with an absence of sunlight as though it were a nocturnal period. There are no adverse effects from this phenomenon.

The incident radiation set-point modify potentiometer 84 serves to provide a voltage output of instantaneous sunlight intensity to provide additional voltage control through summation device 18 to operational amplifier 172. In the case of variable cloudy days and intermittent sunlight, the dry cell 82 and potentiometer 84 act as a long time constant filter or averaging circuit to prevent needless exercising of the heating and cooling equipment. This results in more economical energy use.

The executive set-point modify potentiometer 90 is used variously to modify the temperature set-point for various reasons. For example, at a time when workers are required to be in the building performing certain labor functions it may be desirable to lower the temperature while they are present as a matter of personal comfort. Also, as previously stated, conditions of over-watering and heavy nitrogen application may require specific set-point decrease for a desired period of time each night until the situation is rectified.

The insecticide set-point modify potentiometer 104 works in concert with program switch 114 in order to achieve maximum insecticide effectiveness. Benefits of such usage may include low insecticide concentration and, therefore, economic utilization of insecticide, and it is a definite factor as to worker safety with respect to some applications and certain insecticides. The modify potentiometer 104 may be set to provide a temperature increase during insecticide application so that insects will absorb larger insecticide quantities; program switch 114 would then effect rapid lowering of the ambient temperature causing insects to have greater difficulty in ridding themselves of the insecticide and thereby increasing the kill rate of the application.

The insecticide may be dispensed by any of various automatic dispensers as controlled by program switch 114. For example, it may be desirable to make application approximately one hour before sunset whereupon remote cycle switch 146 (FIG. 3) may be actuated, or the timer motor 142 may be automatically actuated, whereupon program switch 114 commences its cycle of operation. Thus, the control stage 154 may provide such as automatic door lock, audible and/or visual warning indication, vent closure and activation of circulating fan equipment. Thereafter, stage 158 effects release of the powdered or liquid insecticide in predetermined quantity and for a time set by control cam 134. The set-point potentiometer 104 should be set such that the ambient temperature would be raised about 20 degrees F greater than normal ambient temperature during insecticide application. Approximately two hours after the start of the cycle, cam switch 138 opens switch 118 to remove voltage input on line 116 to the summation device 18, thereby to rapidly decrease temperature back to the normal ambient value. Approximately five to twelve hours after start of the insecticide cycle, control cam 136 closes cam switch 160 to activate the ventilating equipment 162 thereby to expel insecticide residues.

The foregoing describes a novel temperature control system which provides fully automated greenhouse control as to various growth-effecting parameters. It is also contemplated that the system can be enlarged by modular addition of circuitry and equipment for use in even very large greenhouse installations wherein a plurality of buildings may be employed. It is also contemplated that the integrated temperature control system may find specific usage for temperature control in other types of buildings such as sports arenas, warehouses and the like.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method of temperature control in greenhouses comprising the steps of:

automatically controlling the temperature as sensed within a greenhouse through adjustment to a predetermined set-point; and further adjusting said set point during dark periods in proportion to the amount of sunlight sensed during the preceding daylight period.

2. A method as set forth in claim 1 which is further characterized to include the step of:

further adjusting said set-point in proportion to the amount of sunlight sensed instantaneously during the daylight periods.

3. A method as set forth in claim 2 which is further characterized to include the step of:

further adjusting said set-point in timed relationship during application of insecticide to increase the set-point during insecticide application and thereafter to decrease said set-point for a predetermined duration.

4. A method as set forth in claim 1 which is further characterized to include the step of:

further adjusting said set-point in timed relationship during application of insecticide to increase the set-point during insecticide application and thereafter to decrease said set-point for a predetermined duration.

* * * * *